US009535455B2

(12) United States Patent
Lakkundi et al.

(10) Patent No.: US 9,535,455 B2
(45) Date of Patent: Jan. 3, 2017

(54) PORTABLE MEDIA ENHANCEMENT DEVICE (71) Applicant: Harman International Industries, Inc., Stamford, CT (US)

(72) Inventors: Ravi Lakkundi, Karnataka (IN); Anandhi Ramesh, Karnataka (IN)

(73) Assignee: Harman International Industries, Inc., Stamford, CT (US)

( * ) Notice: Subject to any disclaimer, the term of this patent is extended or adjusted under 35 U.S.C. 154(b) by 237 days.

(21) Appl. No.: 14/250,503

(22) Filed: Apr. 11, 2014

(65) Prior Publication Data

US 2015/0296171 A1    Oct. 15, 2015

(51) Int. Cl.
*H04N 5/765* (2006.01)
*G06F 1/16* (2006.01)
*G11B 27/00* (2006.01)
*H04N 9/804* (2006.01)
*H04N 9/806* (2006.01)

(52) U.S. Cl.
CPC ............. *G06F 1/1632* (2013.01); *G11B 27/00* (2013.01); *H04N 5/765* (2013.01); *H04N 9/806* (2013.01); *H04N 9/8042* (2013.01)

(58) Field of Classification Search
CPC ...... H04N 7/01; H04N 21/4402; H04N 19/40; H04N 21/4104; H04N 21/2343; H04N 21/4181; H04N 5/93; H04N 5/765; H04N 9/806; H04N 9/8042; G06F 1/1632; G06F 21/34; G06F 21/32; G11B 27/00
USPC ......................................... 386/200, 232, 231
See application file for complete search history.

(56) References Cited

U.S. PATENT DOCUMENTS 5,751,835 A * 5/1998 Topping ................... G06K 9/00
340/5.83
6,744,882 B1 * 6/2004 Gupta ................. H04M 1/6008
379/387.01
(Continued)

FOREIGN PATENT DOCUMENTS

CN        1835552 A    *   9/2006
EP        1980966 A1   *  10/2008
(Continued)

OTHER PUBLICATIONS

Machine generated translation of KR20110025367A to Lee, Mar. 2011.*
Machine generated translation of KR2009128195 to Kwang et al.*

*Primary Examiner* — David Harvey
(74) *Attorney, Agent, or Firm* — Brooks Kushman P.C.

(57) ABSTRACT

A portable media enhancement device for use with a mobile device for processing one or more media files is provided. The mobile device is located separately from the portable media enhancement device. The portable media enhancement device comprises a docking connection input used to communicate with the mobile device and at least one control module. The control module is configured to establish a connection with the mobile device via the docking connection input and to receive one or more media files from the mobile device. The control module is further configured to decode the one or more media files and post process the one or more media files. The control module is further configured to transmit the decoded and processed media files to the mobile device.

25 Claims, 4 Drawing Sheets

(56) References Cited

U.S. PATENT DOCUMENTS

| | | | | |
|---|---|---|---|---|
| 6,782,106 B1* | 8/2004 | Kong | | H04R 5/033 381/110 |
| 7,962,668 B2* | 6/2011 | Ding | | G06F 3/16 710/31 |
| 8,281,359 B2* | 10/2012 | Gagnon | | H04N 21/2389 375/240.01 |
| 8,526,506 B1* | 9/2013 | Xie | | H04N 19/40 375/240.26 |
| 8,922,566 B2* | 12/2014 | Soma | | G06F 13/385 345/520 |
| 8,977,974 B2* | 3/2015 | Kraut | | H04N 5/60 320/129 |
| 9,124,233 B2* | 9/2015 | Zeng | | H03G 9/005 |
| 2005/0282590 A1* | 12/2005 | Haparnas | | H04M 19/044 455/570 |
| 2006/0026302 A1* | 2/2006 | Bennett | | H04L 29/06027 709/246 |
| 2007/0116296 A1* | 5/2007 | Hsieh | | H03G 3/32 381/72 |
| 2007/0160223 A1* | 7/2007 | Cusack | | G10K 11/1788 381/71.1 |
| 2007/0254588 A1* | 11/2007 | Lafuente | | H04M 1/7253 455/41.2 |
| 2008/0082688 A1* | 4/2008 | Yi | | H04L 67/306 709/246 |
| 2008/0320317 A1* | 12/2008 | Funahashi | | G06F 21/32 713/189 |
| 2009/0011794 A1* | 1/2009 | Seo | | H04M 1/72527 455/557 |
| 2009/0092260 A1* | 4/2009 | Powers | | A61N 1/39 381/57 |
| 2009/0140894 A1* | 6/2009 | Schneider | | H03M 7/4006 341/51 |
| 2009/0141894 A1* | 6/2009 | Sahdra | | H04N 21/4104 380/239 |
| 2009/0287324 A1 | 11/2009 | Too | | |
| 2010/0014595 A1* | 1/2010 | Platzer | | H04N 21/44021 375/240.26 |
| 2010/0054326 A1* | 3/2010 | Diamand | | H04N 5/76 375/240.01 |
| 2010/0088292 A1* | 4/2010 | Tirpak | | H04L 65/4084 707/705 |
| 2011/0072166 A1* | 3/2011 | Park | | G11B 27/034 710/13 |
| 2011/0116642 A1 | 5/2011 | Hall et al. | | |
| 2011/0179196 A1* | 7/2011 | Friedman | | H04N 21/4325 710/22 |
| 2011/0304443 A1* | 12/2011 | Sheridan | | H04N 7/163 340/12.5 |
| 2012/0087516 A1* | 4/2012 | Amin | | H03G 3/32 381/107 |
| 2012/0201393 A1* | 8/2012 | Cheek | | H03G 3/32 381/57 |
| 2014/0135963 A1* | 5/2014 | Roeden | | G06F 17/3074 700/94 |
| 2014/0205262 A1* | 7/2014 | Orito | | H04N 5/76 386/231 |
| 2015/0179181 A1* | 6/2015 | Morris | | G10L 19/012 704/226 |
| 2015/0181273 A1* | 6/2015 | Shaool | | H04H 60/15 725/31 |
| 2015/0382106 A1* | 12/2015 | Kraft | | H04R 1/1083 381/119 |

FOREIGN PATENT DOCUMENTS

| | | | |
|---|---|---|---|
| GB | 2426651 A | * | 11/2006 |
| GB | 2442779 A | * | 4/2008 |
| KR | 2009128195 | * | 12/2009 |
| KR | 20110025367 | * | 3/2011 |

* cited by examiner

PORTABLE MEDIA ENHANCEMENT DEVICE

TECHNICAL FIELD

This disclosure relates to a portable media enhancement device and related media systems, in which the portable media enhancement device is able to be quickly and easily connected to a variety of different types of media sources and playback devices.

BACKGROUND

A mobile device provides the convenience of portability and large capacity for storing digital audio, video, and/or image files such as music tracks, movies, voice recordings, multimedia content, and the like. The mobile device may include a central processing unit (CPU) of varying processing power, and often are loaded with features that are intrinsic to the device. The mobile device may be limited to playback certain audio and video files based on file formats that are not compatible with an operating system that controls the device. Such file formats may limit the ability to playback, edit, and/or listen to audio and video files on the mobile device.

Media content sources that provide audio, images, and video files may be stored on the mobile device, streamed from an online server, streamed form a network connection, or content residing on a cloud. The files are typically data-compressed when stored so as to conserve memory space. The quality of playback for the media content files depends largely on the quality of the hardware being utilized to achieve playback of that file on the mobile device.

SUMMARY

In a first illustrative embodiment, a portable media enhancement device for use with a mobile device is provided. The mobile device is located separately from the portable media enhancement device. The portable media enhancement device comprises a docking connection input and at least one control module. The control module is configured to establish a connection with the mobile device via the docking connection input and to receive one or more media files from the mobile device. The one or more media files from the mobile device are not compatible for playback on the mobile device. The control module is further configured to decode the one or more media files to generate one or more decoded files. The control module is further configured to process the one or more decoded files to generate one or more post-processed media files. The control module is further configured to transmit the one or more post-processed media files to the mobile device such that the mobile device plays back the one or more processed media files.

In a second illustrative embodiment, a computer-program product embodied in a non-transitory computer read-able medium that is programmed for transmitting media data from a mobile device to a portable media enhancement device for at least one of processing image display, video display, and audio playback is provided. The computer-program product comprises instructions for establishing a connection with the portable media enhancement device via a docking connection port and receiving one or more media files that are non-compatible with the mobile device to the portable media enhancement device through the port. The computer-program product further comprises instructions for processing the one or more media files to generate one or more processed media files. The computer-program product further comprises instructions for outputting the one or more processed media files that are compatible with the mobile device.

In a third illustrative embodiment, a mobile device including a processor and a transceiver is provided. The transceiver in communication with a portable media enhancement device and the processor in the mobile device in communication with the transceiver. The processor is configured to establish a connection with the portable media enhancement device via the transceiver. The processor is further configured to transmit one or more media files that are non-compatible with the mobile device to the portable media enhancement device. The processor is further configured to receive compatible media files from the portable media enhancement device for output at the mobile device.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

The embodiments of the present disclosure generally provide for a plurality of circuits or other electrical devices. All references to the circuits and other electrical devices and the functionality provided by each, are not intended to be limited to encompassing only what is illustrated and described herein. While particular labels may be assigned to the various circuits or other electrical devices disclosed, such labels are not intended to limit the scope of operation for the circuits and the other electrical devices. Such circuits and other electrical devices may be combined with each other and/or separated in any manner based on the particular type of electrical implementation that is desired. It is recognized that any circuit or other electrical device disclosed herein may include any number of microprocessors, integrated circuits, memory devices (e.g., FLASH, random access memory (RAM), read only memory (ROM), electrically programmable read only memory (EPROM), electrically erasable programmable read only memory (EEPROM), or other suitable variants thereof) and software which co-act with one another to perform operation(s) disclosed herein. In addition, any one or more of the electrical devices may be configured to execute a computer-program that is embodied in a non-transitory computer readable medium that is programmed to perform any number of the functions as disclosed herein.

Figure 1:
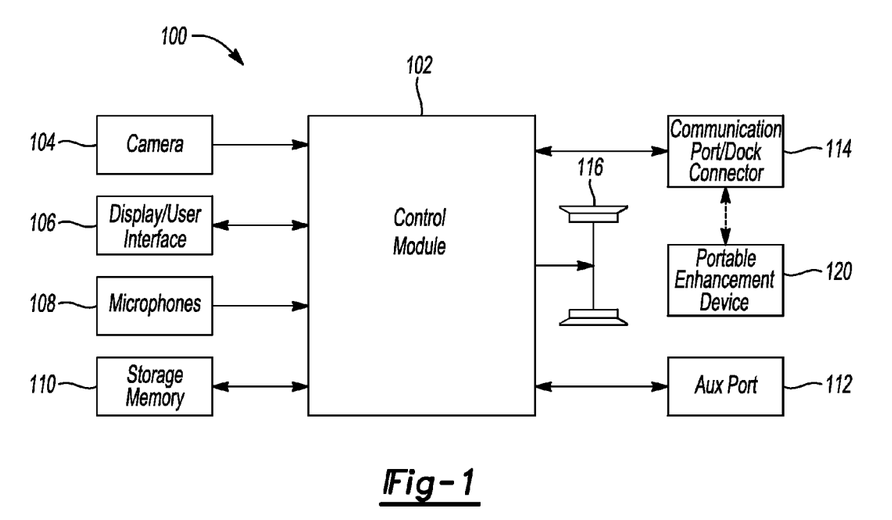
FIG. 1 depicts a diagram of an example of a mobile device communicating with a portable enhancement device according to an embodiment.

FIG. 1 depicts a block diagram of an example of an implementation of a mobile device 100 that is operably coupled to a portable enhancement device 120 in accordance to one embodiment. The mobile device 100 may transmit sound and/or video from a received media file at one or more outputs on the mobile device 100. The mobile device 100 includes one or more control modules 102 (e.g., one or more processors), one or more microphones 108, a camera 104, storage memory 110, a display and/or user interface 106, a communication port 114, one or more speakers 116, and/or an auxiliary port 112. The control module 102 may process received media files and calculate instructions based on data received from the media files. The control module 102 may process the media files based on several media features/functions including, but not limited to, media enhancement, editing capabilities for images and videos, and/or audio/video processing.

The control module 102 may include, but is not limited to, one or more microprocessor-based circuits, custom integrated circuit, and/or a combination of generic and custom circuits programmed to perform one or more of the various methods discussed herein. The memory 110 is in communication with the control module 102 and may be a computer-readable storage medium that stores a set of instructions including signal processing, video/audio display graphics, and/or playback and editing controls. The instructions are capable of being executed with hardware on the mobile device 100 such as the one or more control modules 102. The mobile device 100 may include, but is not limited to, smartphones, personal digital assistants, tablet personal computers, pocket personal computers, and/or notebook computers.

The portable enhancement device 120 and the mobile device 100 are physically separate devices and may be easily connected in signal communication with one another or disconnected from one another without undue installation efforts, and may be easily carried by the user from one location to another. The mobile device 100 may be operated alone without being in signal communication with the portable enhancement device 120. In general, the mobile device 100 and the portable audio enhancement device 120 are physically separate devices that are located separately from each other. Further, such devices 100, 120 may be portable and may further be implement or may be placed in signal communication with one another over any suitable distance by way of physical signal paths (such as, for example, electrical connections and/or conduits) or wireless signal paths (such as, for example, wireless links).

In general, "in signal communication" generally refers to any type of communication and/or connection between the devices (such as, for example, the mobile device 100 and portable enhancement device 120) that allows a given device to pass and/or receive signals and/or information from another device. Specifically, "in signal communication" may refer to any type of communication and/or connection between circuits, components, modules, and/or devices that allows a circuit, component, module, and/or device to pass and/or receive signals and/or information from another circuit, component, module, and/or device. The communication and/or connection may be along any signal path between the circuits, components, modules, and/or devices that allows signals and/or information to pass form one circuit, component, module, and/or device to another and includes wireless or wired signal paths. The signal paths may be physical such as, for example, conductive wires, electrical conduits, electromagnetic wave guides, attached and/or electromagnetic or mechanically coupled terminals, semi-conductive or dielectric materials or devices, ionic, or fluidic, structural, or mechanical relationships or other similar physical connections or couplings. Additionally, signal paths may be non-physical such as free-space (in the case of electromagnetic propagation) or information paths through digital components where communication information is passed from one circuit, component, module, and/or device to another in varying digital formats without passing through a direct electromagnetic connection. The term "coupled" may be interchangeable with the phrase "in signal communication" and "communication link" may be interchangeable with the phrase "signal path". It is also recognized that the mobile device 100 communicates with the portable enhancement device 120 and that additional components may be present between, and/or operatively associated or engaged with, the mobile device 100 and the portable enhancement device 120.

The mobile device 100 may be any type of a communication, audio, or multimedia device or system. The mobile device 100 may be configured to provide audible playback of sound and/or video from an audio source and/or audible/visible playback of sound and video from a media source. The term "mobile device" may be utilized to encompass various types of multimedia systems, entertainment system, and/or portable computing devices. The mobile device 100 may be a stand-alone system or device that includes hardware therein for driving an audio and/or video source and for outputting sound/display derived from media files.

The media files for audio sound may include, but is not limited to, Waveform Audio (.wav), Moving Picture Experts Group standard (MP3), Audio Interchange File Format (AIFF), Adaptive Multi-Rate (amr), Sun Microsystems format (Au), and/or Digital Speech Standard (dss). The media source files for video images may include, but is not limited to, VivoActive (VIV/RM), Windows Media Database file (.wmdb), Video CD or VCS Disc (DAT), Flash Video (FLV), Moving Picture Experts Group standard (MPEG-1), Moving Picture Experts Group standard (MPEG-2), Samsung Video Format (SVI), and/or Apple Video Format (M4V).

The mobile device 100 communication port 114 and/or auxiliary port 112 may be configured to be in signal communication with a secondary/auxiliary source. As an example, the auxiliary port 112 may be a female connector or line input jack of a standard size (e.g., 3.5 mm diameter) into which an audio output line from an auxiliary audio source may be plugged. The auxiliary port 112 may allow for an output jack of standard size or some other type of electrical connector that is adapted to interface with the mobile device 100 to receive a plug of a set of headphones allowing the user to hear the playback of a selected media file. The one or more speakers 116 may be integrated with the mobile device 100 to output an audio signal that is received, processed, and/or generated by the mobile device 100.

The mobile device 100 may store media files in the internal storage memory 110 and/or in a removable memory unit (not shown) of the mobile device 100. The mobile device 100 may be further capable of enabling the user to select a stored media file, or a station or channel over which to receive wireless broadcasts of media information for output as a stream of video/audio signals for playback to the user. The playback of media information for output at the mobile device 100 may be distributed to one or more outputs including, the headphones connected to the auxiliary port 112, the one or more speakers 116, the display 106, and/or a combination thereof.

The communication port 114 enables the mobile device 100 to establish communication with the portable enhancement device 120 via a signal path that may include a direct couple interconnection using an electrical conductor. The portable enhancement device 120 may be used by the mobile device 100 to improve the quality of the media file content received from a media source that may be played back through the display 106, speakers 116, and/or headphones that one coupled to the mobile device 100. The media source stores and/or transmits one or more media files to the mobile device 100. For example, the media source may include, but is not limited to, a website, a server having one or more databases, and/or local memory of the mobile device 100.

For example, the mobile device 100 may not be able to support playback of a High-definition video file due to a lack of decoder/display compatibility and/or audio channel compatibility. The portable enhancement device 120 may be connected to the mobile device 100 to receive and process the High-definition video data from the mobile device 100. The portable enhancement device 120 may process/transcode the data to a format that is accepted by the mobile device 100. The portable enhancement device 120 may transmit the transcoded data to the mobile device 100 for playback at the display 106 and/or speakers 116.

Figure 2:
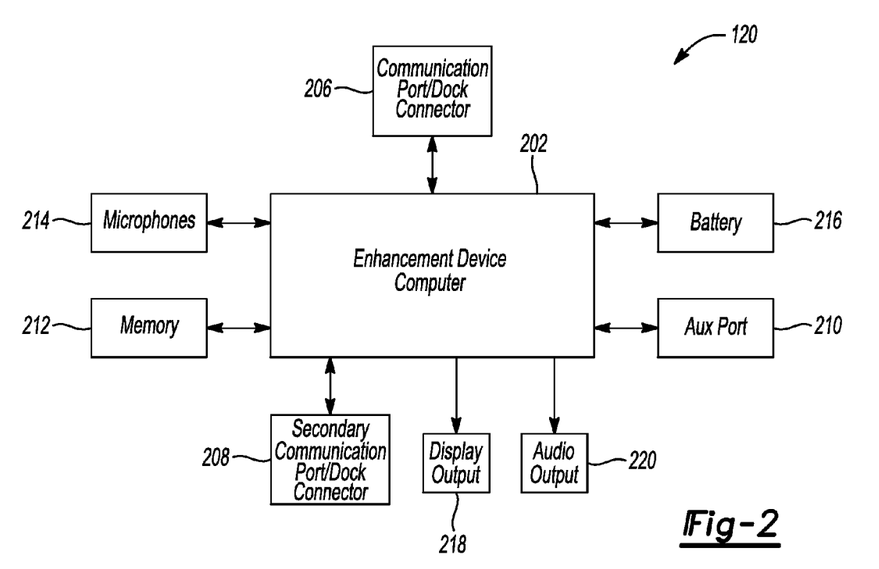
FIG. 2 depicts a diagram of an example of an implementation of the portable enhancement device according to an embodiment.

FIG. 2 depicts a diagram of an example of an implementation of the portable enhancement device 120 according to an embodiment. The portable enhancement device 120 generally includes audio and video signal processing circuitry (not shown), a communication port 206, a secondary communication port 208, one or more microphones 214, and/or an auxiliary port 210. The portable enhancement 120 is placed in signal communication with the mobile device 100 by interconnecting the communication port 114 of the mobile device 100 and the communication port 206 of the enhancement device 120 via a suitable communication link. The communication ports 114, 206 may be connection terminals or plugs adapted for interfacing with the terminal (i.e., electrical conductors, conduits, wires, cables, etc.). Alternatively, the communication ports 114, 206 may be part of wireless transmission circuitry in which case the communication links are wireless links.

The portable enhancement device 120 may include, but is not limited to, a display output connector (e.g., HDMI, Optical, Digital Co-ax, etc. . . . ) 218, analog pre-out audio connector 220, and/or an auxiliary port 210 (e.g., headphone connector). The portable enhancement device 120 computer 202 may include at least one processor (e.g., DSP, GPU, etc. . . . ). The portable enhancement device 120 may be self-powered using a rechargeable battery 216 and/or may draw power form the mobile device 100 when connected. The portable enhancement device 120 may include a microphone(s) 214 for recording the ambient sounds either for purposes of noise or loudness estimation and related enhancements, and/or for purpose of performing acoustic adjustments.

The portable enhancement device 120 may include video and/or audio signal enhancement circuitry (not shown), which may be any type of circuitry that executes instructions for performing an enhancement (or adjustment, correction, etc.) on the video and/or audio signals received from the mobile device 100. The portable enhancement device 120 may produce enhanced video/audio signals for output to the mobile device 100. For example, the enhancement may be a frequency response enhancement, a phase response enhancement, an impulse response enhancement, a dynamic range enhancement, combinations of two or more of the foregoing, as well as other types of enhancements that improve video and sound quality as appreciated by a person skilled in the art. The audio signal processing circuitry may also include circuitry for implementing other audio signal enhancing functions including, but not limited to, channel delay, dynamic range compression, reverb, etc. The audio signal processing circuitry may include dedicated circuitry configured to implement the various audio signal enhancing functions. Such circuitry may be analog and/or digital.

The enhancement device 120 may apply the improved audio and/or video media source signals by implementation of hardware or firmware attributes. For example, the circuitry may implement audio/video signal enhancing circuitry for executing software instructions or algorithms stored in memory 212 with hardware configured with the portable enhancement device 120. In one example, the circuitry includes a digital signal processor (DSP).

The operation of the mobile device 100 with the portable enhancement device 120 allows the mobile device 100 to execute a selected media file that may not be compatible for playback by the mobile device 100. The mobile device 100 processes the selected non-compatible media file to transmit video and/or audio signals representing the media file to the portable enhancement device 120 via the communication link. The portable enhancement device 120 processes the received video and/or audio signals that are non-compatible with the mobile device, and transmits the enhanced video and/or audio signals to the mobile device 100 via the communication ports 114, 206. The mobile device may receive the enhanced video and/or audio signal from the portable enhancement device which are now compatible with the mobile device. In response, the mobile device 100 may process the received enhanced video and/or audio signals as necessary for playback. The mobile device 100 may output the enhanced video and/or audio signals to the display 106 and/or speakers 116.

The portable enhancement device 120 includes hardware for executing a host of audio decoding algorithms/instructions and post processing algorithms/instructions. The post processing algorithms may include, but is not limited to, stereo widening, acoustic equalization, automatic loudness and volume control, low bit rate enhancement, audio upmixing, virtualization, spatialization for headphone playback, speech enhancement, ambient noise reduction using the one or more microphones 214, dynamic range control, acoustic echo cancellation, virtual room simulation, equalization, and/or any other audio post processing algorithms.

The portable enhancement device 120 includes hardware to execute video processing features including, but not limited to, denoising, deinterlacing, upscaling, stabilization, and/or any other video processing algorithms. The portable enhancement device 120 may also be able to decode some or all compressed video data. The portable enhancement device 120 may also include hardware to execute instructions related to image post processing algorithms including, but not limited to, denoising, deblurring, panoramic stitching, color correction, scaling, and/or other image processing algorithms.

The portable enhancement device 120 may continue to apply the same, and/or previously created enhancement processing instructions to the received video and/or audio files from the mobile device 100. The portable enhancement device 120 may be updated, configured, and/or defeated by a mobile application (not shown) running on the mobile device 100. The mobile application may allow input control from a user, in which case the media files may be commanded to pass through the mobile device 100 without augmentation to and/or from the portable enhancement device 120.

The portability of the portable enhancement device 120 and the ease with which it may be coupled to various types of mobile devices 100 provide many benefits to the user of the mobile device 100. For example, the portable enhancement device 120 is a plug-and-play device that does not require any hardware modifications related to the mobile device 100. The portable enhancement device 120 may require the mobile device 100 to download an application to manage one or more features of the portable enhancement device 120. The one or more features may include, but is not limited to, editing, generating, and/or processing media files. The portable enhancement device 120 when electrically coupled to the mobile device 100, may improve the quality of the viewing and listening experience of media files based on an analysis of the deficiencies of the video and audio playback on the mobile device 100.

Figure 3A:
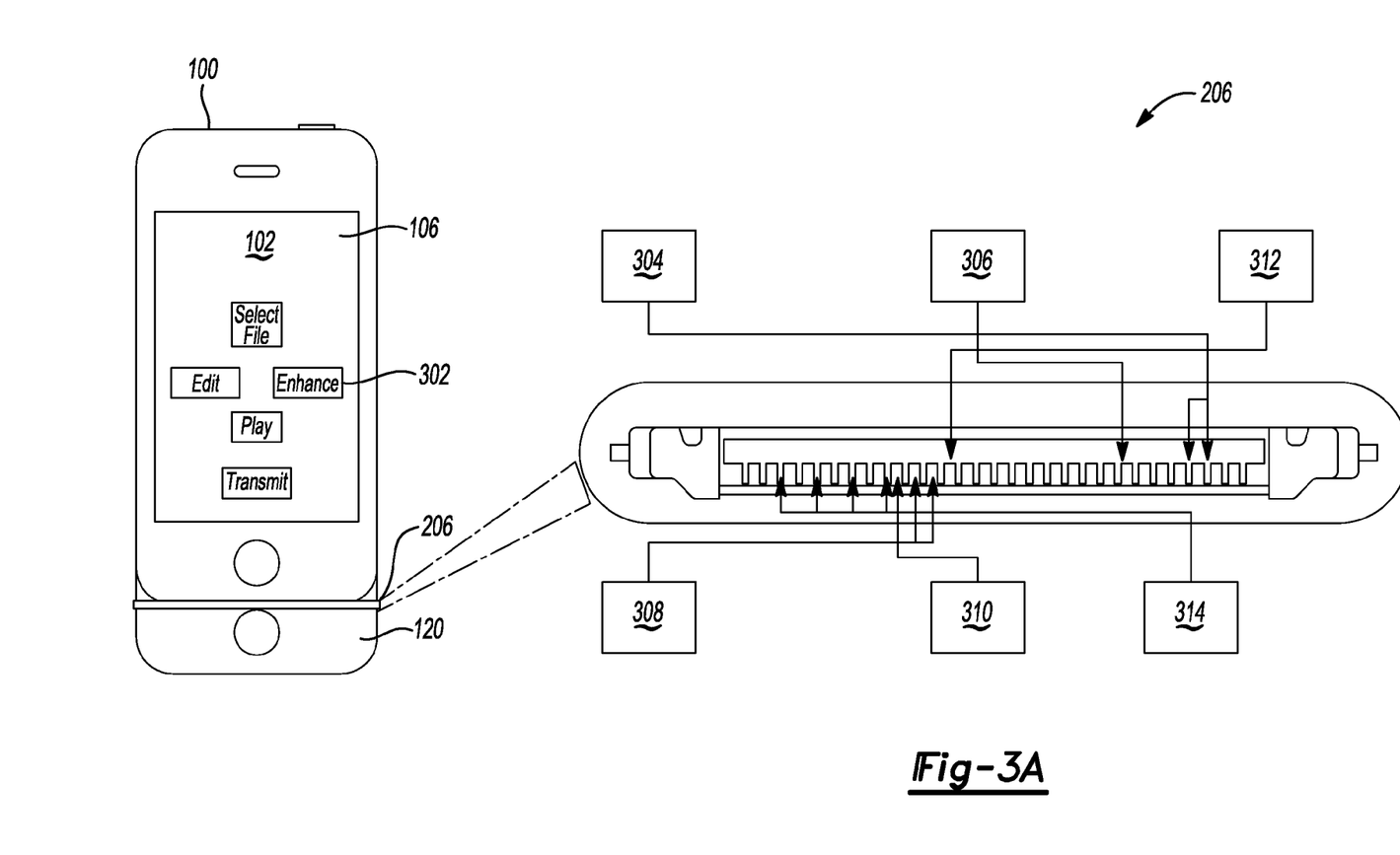
FIGS. 3A-3B depict diagrams of an implementation of a control module implemented on the mobile device that communicates with the portable enhancement device according to an embodiment.
Figure 3B:
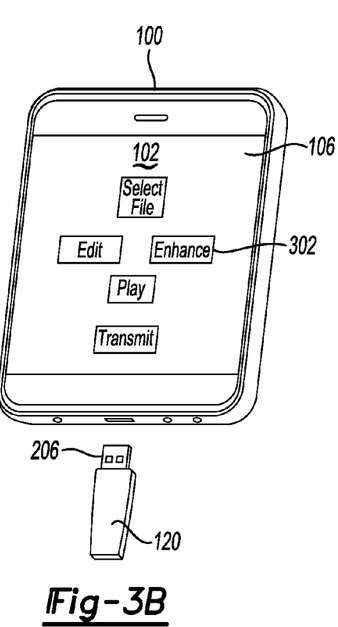

FIGS. 3A and 3B depict diagrams of an implementation of a control module 102 embedded on the mobile device 100 that communicates with the portable enhancement device 120 according to an embodiment. In FIG. 3A the mobile device 100 is in a form of a smartphone device.

The portable enhancement device 120 may be configured to connect and interact with the mobile device 100 using a two-way connection communication link as the communication port 206. The portable enhancement device 120 may have a male connector as the communication port 206 while the mobile device 100 may have a female connector (not shown) as the communication port 114. The portable enhancement device 120 may also connect with the mobile device 100 using a wireless connection (not shown). The portable enhancement device 120 male connector communication port 206 may include, but is not limited to, a multi-pin (e.g., 30 pin, 19 pin, 10 pin, etc. . . . ) interface. The two-way connection between the mobile device 100 and the portable enhancement device 120 may be configured to allow bi-directional communication of different signal types (e.g., analog, digital).

As illustrated in FIG. 3A, the male connector communication port 206 may have a multi-pin connector configuration including, but not limited to, pins to receive sound/video/images 304, pins to transmit sound/video/images 306, pins to receive power 308, pins to supply power 312, pins to transfer status information 314, and/or pins to communicate with connected accessories 310. In one embodiment, the portable enhancement device 120 may receive power 308 through the two-way connection communication ports 114, 206 when attached to the mobile device 100. In another embodiment, the portable enhancement device 120 may have a battery 216 for supplying power to the portable enhancement device 120 and/or the mobile device 100. The multi-pin connector configuration may include various embodiments of a physical interface having characteristics of various pin-outs and physical construction, size, contact resistance, insulation between pins, ruggedness and resistance to vibration, resistance to entry of water, and ease of connecting and disconnecting.

In one example, the bi-direction communication of different signal types may include audio data sent from the mobile device 100 to the portable enhancement device 120. The audio data may be a digital audio signal that may get processed by the portable enhancement device 120 by adding audio enhancement processing and converting it into an analog audio signal. The portable enhancement device 120 may complete the converting of the audio file and transmit the data back to the mobile device 100.

In another example, the mobile device 100 may not be able to process/output an audio file with a five channel output. The mobile device 100 may transmit the non-compatible audio file to the portable enhancement device 120 using one or more applications being executed on hardware of the mobile device 100. The portable enhancement device 120 may receive the audio file and process the file in a decode operation and a down-mixer operation to take the five channel audio file to a two channel audio file. The portable enhancement device 120 may transmit the two channel audio file to the mobile device 100. Instead of decoding and down-mixing the five channel audio file, the enhancement device 120 may receive the five channel audio file and output the audio file as is to the auxiliary port 210 and/or the audio output 220 of the portable enhancement device 120.

The portable enhancement device 120 may require that the smartphone device 102 download and enable a control application 302 for managing the operation of the portable enhancement device 120. The control application 302 may be transmitted from the portable enhancement device 120 once a connection is made to the mobile device 100. The control application 302 may allow the presentation of the portable enhancement device 120 control options using the mobile device 100 display/user interface 106. The control options may include, but is not limited to, selecting a file, editing the selected file, enhancing the selected file, playing the selected file, and/or transmitting the selected file to the portable enhancement device. The control application 302 enabled on the mobile device 100 may allow a user to configure and/or manage features available on the portable enhancement device 120. The control application 302 may enable a user to download and/or purchase new multimedia processing features for the portable enhancement device 120'. The control application 302 may manage the update of firmware on the portable enhancement device 120, activate and deactivate algorithms, control the parameters of an active algorithm, and/or read the status or other advanced data like the signal frequency or gain information for the display 106 on the mobile device 100.

FIG. 3B depicts a diagram of another example of an embodiment of the control module 102 being implemented on a mobile device 100 and communicating with the portable enhancement device 120 using a universal serial bus (USB) communication port 206. In FIG. 3B, the mobile device 100 is in a form of a tablet device. The portable enhancement device 120 in FIG. 3B may be configured to connect and interact with the tablet device 102 using a two-way connection communication port 206. The two-way connection communication port 206 may include, but is not limited to, a USB connection between the mobile device 100 and the portable enhancement device 120. The USB communication port 206 may be configured to allow bi-directional communication of different signals types. The portable enhancement device 120 may require a control application 302 to be downloaded and enabled at the mobile device 100 to manage operation of the portable enhancement device 120.

Figure 4:
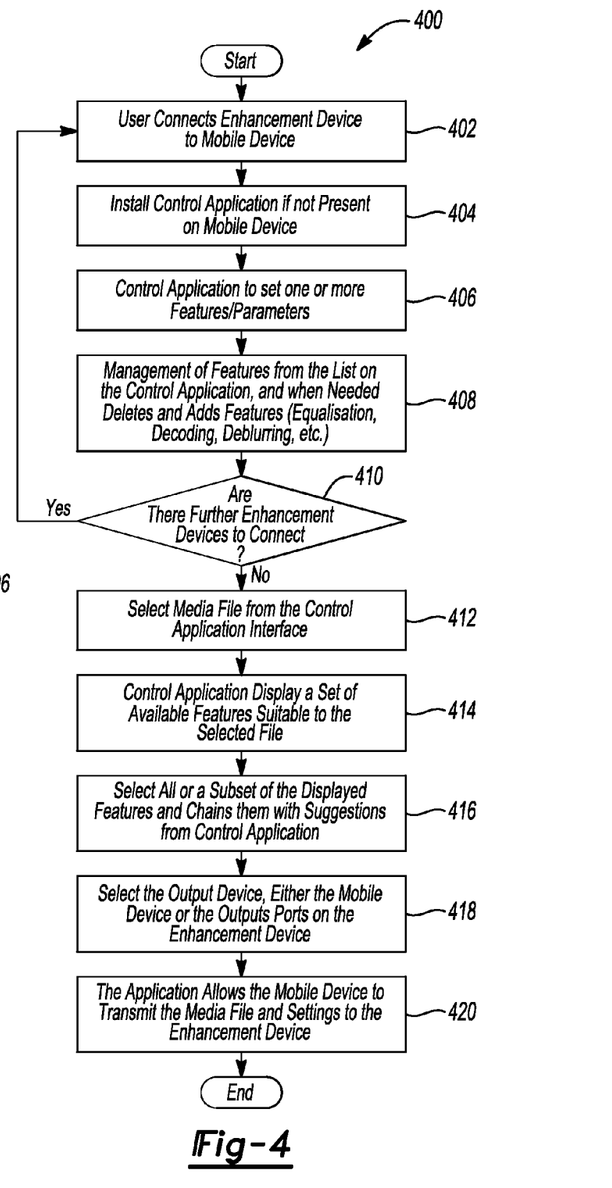
FIG. 4 depicts a flow chart illustrating a method for the mobile device to operate the portable enhancement device according to an embodiment.

FIG. 4 depicts a flow chart illustrating a method for the mobile device 100 to operate the portable enhancement device 120 according to an embodiment. The control module 202 of the portable enhancement device 120 may receive data from the mobile device 100 and determine the particular type of data. The communication of data between the portable enhancement device 120 and mobile device 100 using the communication ports 114, 206 may include wired technology and wireless technology.

In operation 402, the mobile device 100 establishes communication with the portable enhancement device 120. The mobile device 100 may install a control application 302 to operate the portable enhancement device 120 as shown in operation 404. The control application 302 may be transmitted from the portable enhancement device 120 to the mobile device 100 once communication has been established between the devices. The control application 302 may also be downloaded from one or more remote servers in communication with the mobile device 100.

In operation 406, the mobile device 100 may set one or more media file parameters and features including, but not limited to, equalization, decoding, and deblurring. The mobile device 100 may allow the management of a set of tools, features and/or file parameters based on a recognized media file(s) using the control application 302. The mobile device management of the tools/features/parameters may include, but is not limited to, processing, editing, presenting, decoding, and/or down-mixing in operation 408.

In operation 410, the mobile device 100 may recognize if one or more portable enhancement devices 120 are connected and/or are communicating with the mobile device 100. If the mobile device 100 recognizes that one or more portable enhancement devices 120 are connected, the mobile device 100 may update the compatibility of offering additional control application features that may be enabled based on the additional processing power of the one or more portable enhancement devices 120.

In operation 412, the mobile device 100 may allow a media file to be selected at the user interface 106. The mobile device 100 may display a set of available features that may be suitable based on the selected media file as shown in operation 414. The set of available features may allow for processing, editing, presenting, and/or mixing of the media file.

For example, if an image file is selected at the mobile device 100, a set of available features based on the image file may be presented at the mobile device 100 user interface 106 display. The available features for that selected image file may include, but is not limited to, editing capabilities. The editing capabilities may allow a user to edit the image file with the use of the portable enhancement device 120.

In operation 416, the mobile device 100 may allow for one or more selections of the displayed features/tools/parameters. The mobile device 100 may allow input suggestions with the selection of each feature. For example, the input suggestion for a selection of a feature may allow a user to request additional instructions of what processing and/or editing is being done to the media file at the portable enhancement device 120. The mobile device 100 may also allow the selection of where to output the selected media file data such that it may be displayed and/or performed either at the mobile device 100 and/or at the output ports 218, 220 on the portable enhancement device 120.

In operation 420, once the feature selection(s) have been determined, the mobile device 100 may transmit the media file and settings to the portable enhancement device 120. The portable enhancement device 120 may perform the selected task(s) based on the selected features and output the processed media file(s) once it has completed the task(s).

Figure 5:
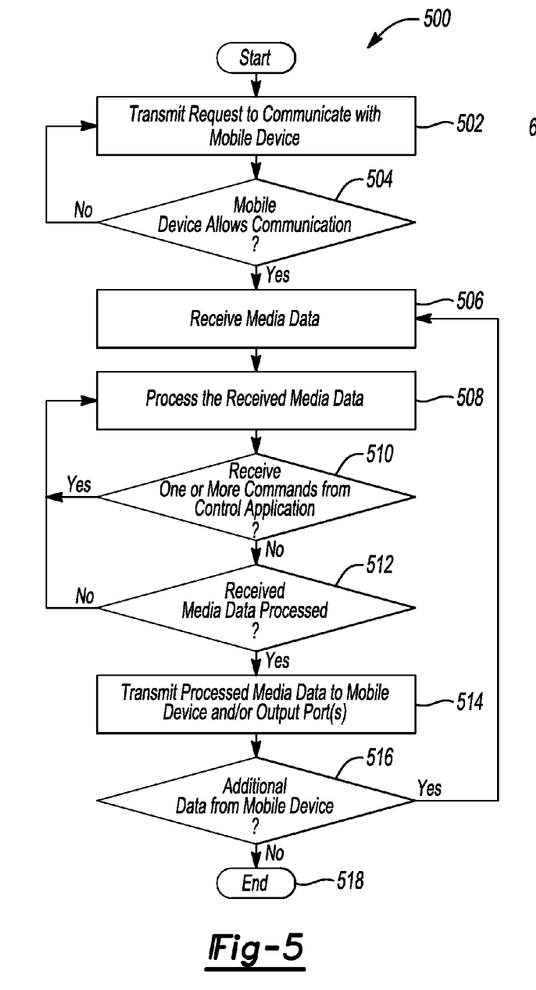
FIG. 5 is a flow chart illustrating a method for processing one or more media files at the portable enhancement device according to an embodiment.

FIG. 5 is a flow chart illustrating a method 500 for processing one or more media files at the portable enhancement device 120 according to an embodiment. The method 500 is implemented using software code included within the control module 202 and executed on hardware in the portable enhancement device 120.

Referring again to FIG. 5, the portable enhancement device 120 and its components illustrated in FIG. 2 are referenced throughout the discussion of the method 500 to facilitate understanding of various aspects of the present disclosure. The method of enhancing media files received from the mobile device 100 may be implemented through a computer algorithm, machine executable code, or software instructions programmed into a suitable programmable logic device(s) of the portable enhancement device 120, such as the computer, or other controllers in communication with the portable enhancement device 120, or a combination thereof. Although the various operations shown in the flowchart diagram appear to occur in a chronological sequence, at least some of the operations may occur in a different order, and some operations may be performed concurrently or not at all.

In operation 502, the portable enhancement device 120 may recognize a connection has been established with the mobile device 100 and therefore transmit a request to communicate with the mobile device 100. The mobile device 100 may begin to enable the control application 302 associated with the portable enhancement device 120. The mobile device 100 may allow communication between the mobile device 100 and the portable enhancement device 120 using the control application as shown in operation 504.

In one example, once communication has been established between the two devices, a user of the mobile device 100 may choose a particular media file for processing by the portable enhancement device 120. In response to the selected media file, the control application may output a list of one or more features of the portable enhancement device (s) 120 based on the media file. The user may select one or more features of the portable enhancement device 120 to process, enhance, and/or edit the selected media file. The user may chain the operation of these selected features such that the operations are in any order the user chooses, with some suggestions from the control application 302 regarding the same. The user may also decide whether the processed media file data is to be transferred back to the mobile device 100 or transmitted by the portable enhancement device 120 via the output ports 220, 218. The user may indicate that his choices are ready by pressing a command button (e.g., send command) on the control application 302 to transmit the request to the portable enhancement device 120.

In operation 506, the portable enhancement device 120 may receive media data from the mobile device 100. The enhancement device 120 may process the received media data in operation 508. For example, if an image file is selected by the control application 302 on the mobile device 100, the control application 302 may allow editing of the image by using the portable enhancement device 120. Using the control application 302, the user may request to edit the image by enlarging it, therefore image data may be sent to the portable enhancement device 120 for processing and updating. The portable enhancement device 120 may transmit the enhanced image back to the mobile device 100 once the editing is complete.

In operation 510, the portable enhancement device 120 may receive one or more processing commands from the control application 302 being executed at the mobile device 100. The one or more commands may be managed by the control application 302 and presented at a user interface 106 on the mobile device 100. The user interface 106 may receive user input to configure one or more parameters of the enhancement device 120 using the control application 302. Based on the received input form the control application 302, the portable enhancement device 120 may continue to process the received data in operation 508.

In operation 512, if the received media data has been processed, the portable enhancement device 120 may prepare to transmit the media data back to the mobile device 100. The portable enhancement device 120 may transmit the media data to the mobile device 100 and/or to one or more output ports 210, 218, 220 on the enhancement device 120 in operation 514.

In operation 516, the portable enhancement device 120 may continue to receive additional data from the mobile device 100. For example, the mobile device 100 may be streaming a motion picture not compatible with the mobile device over WiFi, therefore the media data may continuously be sent to the portable enhancement device 120 for processing/improvement such that the image and/or sound may be outputted at the mobile device 100. The mobile device 100 may discontinue transmitting data once the control application 302 terminates communication with the portable enhancement device 120 in operation 518.

Figure 6:
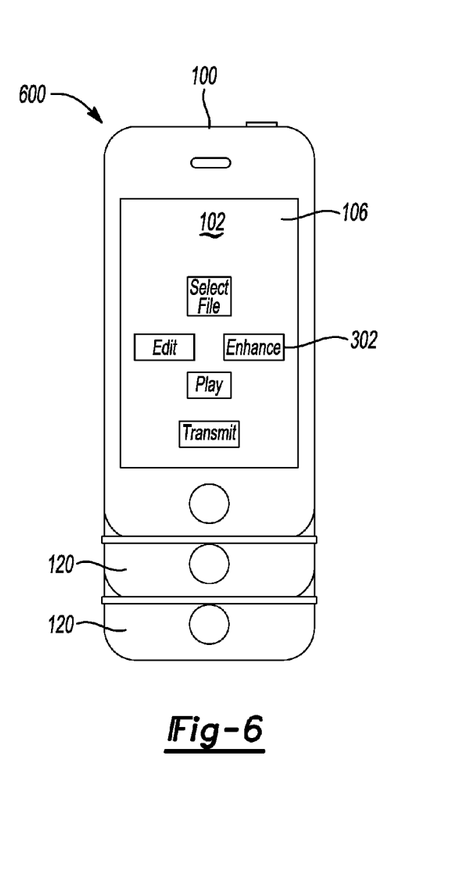
FIG. 6 depicts a diagram of an example of an implementation of the mobile device utilizing one or more portable enhancement devices according to an embodiment.

FIG. 6 depicts a diagram 600 of an example of an implementation of the mobile device 100 utilizing one or more portable enhancement devices 120 according to an embodiment. The one or more portable enhancement devices 120 may be configured to allow for daisy chaining additional portable enhancement devices 120 to improve processing capability.

For example, the mobile device 100 may establish communication using the communication ports 114, 206 with the portable enhancement device 120 to process audio and/or video files. If a user decides that she would like to perform additional operations during the processing of audio/video files, an additional portable enhancement device 120 may be connected to the first portable enhancement device 120 using the secondary communication port 208. The processing power may thus be increased with the addition portable enhancement device 120 connected. The control application 302 may transmit a notification to the user interface 106 of the mobile device 100 to inform the user additional processing capability is now available with the established communication of the additional portable enhancement device 120.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A portable media enhancement device for use with a mobile device, where the mobile device is located separately from the portable media enhancement device, the portable media enhancement device comprising:
   a docking connection input;
   at least one processor and a memory, wherein the memory contains instructions for causing the processor to:
      establish a connection with a mobile device via the docking connection input;
      receive one or more media files from the mobile device, the one or more media files are not compatible for playback on the mobile device;
      decode the one or more media files to generate one or more decoded files;
      process the one or more decoded files to generate one or more post-processed media files; and
      transmit the one or more post-processed media files to the mobile device such that the mobile device plays back the one or more processed media files; and
   a microphone to sense ambient sound for use by the processor when generating the post-processed media files.

2. The portable media enhancement device of claim 1, further comprising at least one of a display output and an audio output.

3. The portable media enhancement device of claim 2, wherein the at least one processor is further configured to transmit the post-processed media files to an alternate device for output based on the at least one of the display output and the audio output.

4. The portable media enhancement device of claim 2, wherein the display output is at least one of High-Definition Multimedia Interface connector, optical connector, DisplayPort connector, Digital connector, and a coaxial connector.

5. The portable media enhancement device of claim 2, wherein the audio output is at least one of coaxial, optical and digital interconnect format.

6. The portable media enhancement device of claim 1, wherein the process of the one or more media files is at least one of stereo widening, acoustic equalization, automatic loudness and volume control, low bit rate enhancement, and audio upmixing, which use the ambient sound from the microphone.

7. The portable media enhancement device of claim 1, wherein the process of the one or more media files is at least one of denoising, deinterlacing, upscaling, and stabilization.

8. The portable media enhancement device of claim 1, wherein the docking connection input includes at least one of wireless communication and wired communication, the wireless is at least one of WiFi, Near Field Communication, BLUETOOTH, and the wired communication is at least one of Serial Peripheral Interface Bus, Inter-Integrated circuit, and Universal Asynchronous Receiver/Transmitter.

9. A non-transitory computer medium that is encoded with instructions, when executed by a device, cause the device to:
 establish a connection with a portable media enhancement device and a mobile device via a docking connection port;
 receive at the portable media enhancement device, from the mobile device one or more media files that are non-compatible with the mobile device;
 sense ambient sound with a microphone;
 process the one or more media files and the sensed ambient sound to generate one or more processed media files to be compatible with the mobile device; and
 output the one or more processed media files to the mobile device.

10. The computer media of claim 9, further comprising instructions for receiving an editing command for the one or more media files, to edit the one or more processed media files; and outputting the edited media files.

11. The computer media of claim 10, wherein the editing command includes at least one of image cropping, resizing, and brightness changes.

12. The computer media of claim 11, wherein the editing command is received at a user interface on the mobile device.

13. The computer media of claim 9, further comprising instructions for enabling wireless communication or wired communication with the portable media enhancement device via the docking connection port.

14. The computer media of claim 9, wherein the instructions for processing of the one or more media files further includes instructions for performing at least one of denoising, deinterlacing, upscaling, stabilization, stereo widening, acoustic equalization, and audio upmixing of the one or more media files.

15. A mobile device comprising:
 a transceiver in communication with an portable media enhancement device; and
 a processor positioned in the mobile device in communication with the transceiver, the processor being configured to:
  establish a connection with the portable media enhancement device via the transceiver;
  transmit one or more media files that are non-compatible with the mobile device to the portable media enhancement device; and
  receive compatible media files, which have been audio processed to account for ambient sound sensed by the portable media enhancement device, from the portable media enhancement device for output at the mobile device.

16. The mobile device of claim 15, wherein the processor is further configured to output the media files to at least one of a display output and an audio output.

17. The mobile device of claim 16, wherein the processor is further configured to transmit the media files to an alternate device for output based on the at least one of the display output and the audio output.

18. The mobile device of claim 16, wherein the display output is at least one of High-Definition Multimedia Interface connector, optical connector, DisplayPort connector, Digital connector, and a coaxial connector.

19. The mobile device of claim 16, wherein the audio output is at least one of coaxial, optical and digital interconnect format.

20. The mobile device of claim 15, wherein the transceiver is at least one of wireless communication and wired communication.

21. The portable media enhancement device of claim 1, wherein the at least one processor is configured to use the ambient sound sensed by the microphone to develop a virtual room simulation and to process audio using the virtual room simulation.

22. The portable media enhancement device of claim 1, wherein the at least one processor is configured to receive processing control signals from the mobile device.

23. The portable media enhancement device of claim 1, wherein the at least one processor is upload a control application to the mobile device and receive control instructions for processing the media file from the control application on the mobile device.

24. A portable media enhancement device for use with a mobile device, where the mobile device is located separately from the portable media enhancement device, the portable media enhancement device comprising:
 a docking connection;
 at least one processor and a memory, wherein the memory contains instructions for causing the processor to:
  establish a connection with a mobile device via the docking connection;
  receive a media file from the mobile device, the media file not being compatible for playback on the mobile device;
  decode the media file to generate a decoded file;
  process the decoded file to generate a processed media file; and
  transmit the processed media file to the mobile device such that the mobile device plays back at least part of the processed media file; and
 an audio output separate from the docking connection and operably connected to the processor,
 wherein the processor outputs audio of the processed media file to the audio output and video of the processed media file to the docking connection.

25. The device of claim 24, wherein the processor does not down-mix the audio of media file to be compatible with the mobile device.

* * * * *